United States Patent Office 2,814,608
Patented Nov. 26, 1957

2,814,608

NOVEL COMPOSITIONS OF MATTER AND PROCESSES OF PREPARING SAME

John C. Petropoulos, South Norwalk, Conn., assignor to American Cyanamid Company, New York, N. Y., a corporation of Maine No Drawing. Application March 2, 1955,
Serial No. 491,770

20 Claims. (Cl. 260—72)

This invention relates to novel condensation products and to the process of preparing the same. More particularly, this invention relates to the process of preparing condensation products by reacting an aldehyde with certain sulfamoyl indans and to the product thus produced. Still further, this invention relates to the process of reacting an aldehyde, a compound containing an alcoholic hydroxy group and certain sulfamoyl indans and to the products thus produced.

One of the objects of the present invention is to produce a condensation product by reacting an aldehyde with sulfamoyl indans. A further object of the present invention is to produce condensation products by reacting an aldehyde with a compound containing an alcoholic hydroxy group and a compound having the general formula:

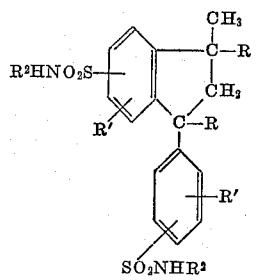

wherein R is a member selected from the group consisting of a halo group and an alkyl group, containing from 1 to 4 carbon atoms, R' is an alkyl group containing from 1 to 4 carbon atoms and $R^2$ is a member selected from the group consisting of H and an alkyl group containing 1 to 20 carbon atoms. These and other objects of the present invention will be discussed in greater detail hereinbelow.

The sulfamoyl indanes used in the preparation of the condensation products of the present invention may be prepared by reacting ammonia with the sulfonated reaction product of an indan derived from the dimerization of an alpha alkyl p-alkyl styrene and the like.

The sulfamoyl indanes used in the present invention may be prepared by starting with dimers of substituted styrenes having an alkyl group or a halo group in the alpha position and an alkyl group having between 1 and 4 carbon atoms on the ring. The alkyl group in the alpha position may be any one of methyl, ethyl, propyl, and butyl. The same applies in the alkyl group on the ring. The alkyl group on the ring may be in either the ortho, meta or para position. Representative of the class of alkyl substituted styrenes which may be used in the practice of the process of the present invention are α,o-dimethylstyrene, α,m-dimethylstyrene, α,p-dimethylstyrene, α,ethyl-o-methylstyrene, α-ethyl-m-methylstyrene, α-ethyl-p-methylstyrene, α-propyl-o-methylstyrene, α-propyl-m-methylstyrene, α-propyl-p-methylstyrene, α-butyl-o-methylstyrene, α-butyl-m-methylstyrene, α-butyl-p-methylstyrene and the like. In the place of the alkyl groups containing between 1 and 4 carbon atoms which may be substituted on the side chain in the α position, one may utilize the halo substituents such as the chloro, bromo, iodo and fluoro. Representative of this class of compounds are α-chloro-m-methylstyrene, α-bromo-p-methylstyrene, α-iodo-o-methylstyrene, α-fluoro-p-methylstyrene and the like. The alkyl substituent on the ring may be the sole substituent on the ring or it may be accompanied by other substituents such as other alkyl groups, halo groups, such as those mentioned hereinabove and the like. Styrenes that are unsubstituted on the ring may also be used. In order that the process for the preparation of these dimers may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

DIMERIZATION OF α,p-DIMETHYLSTYRENE 800 parts of toluene cooled to 5° C. are introduced into a suitable reaction vessel. To the toluene, there is added 140 parts of a 95% sulfuric acid. The mixture is stirred thoroughly and maintained at a temperature of about 0–5° C. To the cooled mixture, there is added 260 parts of α,p-dimethylstyrene dissolved in 200 parts of toluene. The resulting mixture is allowed to react for ½ hour at 0–5° C. and is then hydrolyzed with 120 parts of water. The organic layer, is washed free of acidic material, with water and is distilled to yield 250 parts of a colorless oil having a boiling point of 142–144° C. at 0.8 mm. This oil solidifies and has a melting point of 37–38° C. uncorrected.

DIMERIZATION OF α-ETHYL-p-METHYLSTYRENE

To 400 parts of toluene at 5° C., there is added slowly 70 parts of 95% sulfuric acid followed by 144 parts of α-ethyl-p-methylstyrene dissolved in 100 parts of toluene. The temperature is maintained at 0–10° C. during the entire addition. The resulting mixture is allowed to react for ½ hour and then is hydrolyzed with 100 parts of water. The organic material is collected, washed free of acidic material with water and distilled to yield 130 parts of a colorless liquid having a boiling point of 160–165° C. at 1 mm.

DIMERIZATION OF α,META-DIMETHYLSTYRENE

To 200 parts of toluene at 0–5° C., there is added slowly 35 parts of 95% sulfuric acid, 65 parts of α,m-dimethylstyrene dissolved in 50 parts of toluene. The resulting mixture is allowed to react for about ½ hour and is then hydrolyzed with water. The organic material is collected, washed and distilled to yield 61 parts of a colorless liquid having a boiling point of 144–148° C. at 1 mm. pressure.

DIMERIZATION OF CRUDE α,p-DIMETHYLSTYRENE

To 368 parts of toluene at 10° C., there is added slowly 50 parts of anhydrous aluminum chloride followed by 516 parts of crude (undistilled) α,p-dimethylstyrene dissolved in 368 parts of toluene while maintaining the temperature below 10° C. After a 20-minute reaction time, the mixture is hydrolyzed with water and the organic layer is collected and dried. The organic material is distilled to give 150 parts of a colorless oil having a boiling point of 138–140° C. at 0.5–1 mm.

DIMERIZATION OF α,p-DIMETHYLSTYRENE

A mixture of 310 parts of freshly distilled α,p-dimethylstyrene and 2 parts of p-toluene sulfonic acid are heated in a steam bath for about 16 hours and then allowed to react at room temperature for 2½ months, at which time the p-toluene sulfonic acid catalyst is removed by washing the organic layer with dilute sodium bicarbonate solution. Distillation of the organic layer gave 151 parts of a very light yellow colored oil having a boiling point of 136–140° C. at 1 mm. pressure.

By dimerizing alpha alkyl styrenes of alpha halo styrenes in a manner comparable to the example set forth hereinabove, one could produce the following indanes which would be useful as a starting material in the preparation of sulfamoyl derivatives used to form the condensation products of the present invention: 1-phenyl-1,3,3-trimethyl-indan; 1-phenyl-1,3-diethyl-3-methyl-indan; 1-phenyl-1,3-dipropyl-3-methyl-indan; 1-phenyl-1,3-dibutyl-3-methyl-indan; 1-phenyl-1,3-dichloro-3-methyl-indan; 1-phenyl-1,3-diiodo-3-methyl-indan; 1-phenyl-1,3-dibromo-3-methyl-indan; 1-phenyl-1,3-difluoro-3-methyl-indan; 1-(4-methylphenyl)-1,3,3,6-tetramethyl-indan; 1-(4-methylphenyl)-1,3-diethyl-3,6-dimethyl-indan; 1-(4-methylphenyl)-1,3-dipropyl-3,6-dimethyl-indan; 1-(4-methylphenyl)-1,3-dibutyl-3,6-dimethyl-indan; 1-(3-methylphenyl)-1,3,3,-5-tetramethyl-indan; 1-(3-methylphenyl)-1,3-diethyl-3,5-dimethyl-indan; 1-(3-methylphenyl)-1,3-dipropyl-3,5-dimethyl-indan; 1-(3-methylphenyl)-1,3-dibutyl-3,5-dimethyl-indan; 1-(3-methylphenyl)-1,3-dichloro-3,5-dimethyl-indan; 1-(3-methylphenyl)-1,3-dibromo-3,5-dimethyl-indan and the like.

In order to prepare the sulfamoyl derivatives from indanes such as those set forth hereinabove, it is necessary to prepare the sulfonate derivative as a starting material which sulfonate derivative may be converted to the sulfamoyl derivative by reaction with ammonia or by reacting the sulfonate derivative with an alkaline material to form the salt of the sulfonate, thereafter reacting the said salt with a halogen donor to produce the sulfonyl halide which is then reacted with ammonia to produce the sulfamoyl derivative. Although the former process is effective, the yields are comparatively small and, as a consequence, in view of the much larger yields the latter approach is more desirable. In order that this process may be completely understood, the following examples are set forth in which all parts are parts by weight. These examples are set forth primarily for the purpose of illustration and any specific enumeration of detail contained therein should not be interpreted as a limitation on the case except as is indicated in the appended claims.

METHOD FOR THE PREPARATION OF 1-(4-METHYL - 3 - SULFAMOYLPHENYL) - 1,3,3,6 - TETRAMETHYL-5-SULFAMOYL-INDAN

Into a suitable reaction vessel equipped with thermometer and stirrer, there is introduced 250 parts of 1-(4-methylphenyl)-1,3,3,6-tetramethyl-indan. The charge is heated to about 50° C. and there is slowly added 400 parts of fuming sulfuric acid (15–18%). The reaction mixture is raised to about 100° C. at which time it is cooled and poured into a mixture of 1000 parts of concentrated hydrochloric acid and 500 parts of water. On cooling, needle-like crystals appear and are collected. The disulfonic acid crystals thus produced melt at about 100–104° C. and have a neutral equivalent of 239 indicating that the acid crystallizes with two molecules of water. 50 parts of the acid are dissolved in 50 parts of water and to the solution there is added gradually a 20% solution of potassium hydroxide until a pH of 8 is reached. The salt solution thus produced is evaporated to dryness on a tray. A mixture of 18 parts of the anhydrous dipotassium salt of the acid thus produced and 18.5 parts of phosphorus pentachloride are stirred together in a suitable reaction vessel during the exotherm. The paste which is formed is heated after the exotherm at 110–120° C. for about 1 hour. The volatiles (excess phosphorus pentachloride and phosphorus oxychloride is formed) are removed by vacuum concentration at 100° C. for 1½ hours. The solid product produced is ground to a powderous material and mixed with 100 parts of water and 100 parts of chloroform. The chloroform layer is concentrated. Heptane is added to the concentrate causing the solid product to precipitate. The yield amounted to about 91% and melted at 140–141° C. unc. Recrystallization from heptane raised the melting point to 142–3° C. unc.

Into a suitable reaction vessel equipped with thermometer, stirrer and reflux condenser, there is added a mixture of 5 parts of disulfonyl chloride compound thus produced and 50 parts of a 28% aqueous ammonia solution and 1 part of chloroform. The mixture is heated on a steam bath for one hour with constant stirring. The mixture is cooled in an ice bath, and acidified to Congo-red with dilute sulfuric acid. The solid material which forms is collected in a 97% yield and has a melting point of 194–7° C. unc. Recrystallization raises the melting point to 205° C. uncorrected and 240° C. uncorrected. The material is seemingly polymorphic, it melts at 205° C., resolidifies at 210° C. and then remelts at 240° C.

*Analysis.*—Calculated for $C_{20}$, $H_{26}$, $N_2$, $O_4$, $S_2$: C, 56.84; H, 6.20; N, 6.63. Found: C, 56.67; H, 6.44; N, 6.42.

METHOD FOR THE PREPARATION OF 1-[4-METHYL-3-(PROPYLSULFAMOYL) - PHENYL]-1,3,3,6-TETRAMETHYL - 5 - PROPYLSULFAMOYL-INDAN

Into a suitable reaction vessel equipped with thermometer, stirrer and reflux condenser, there is added 50 parts by weight of a 10% aqueous solution of potassium hydroxide and 20 parts of n-propylamine. To this mixture, there is added slowly 7 parts of the disulfonyl chloride compound prepared according to the first part of the preceding example. The mixture is then refluxed for about ½ hour and the excess propylamine is removed by steam distillation. Acidification of the residue with dilute sulfuric acid causes the product to precipitate as a sticky solid mass, which slowly crystallizes. The crude product (89% yield) melts at 126-8° C., unc. Recrystallization from methanol raises the melting point to 133° C., unc.

*Analysis.*—Calculated for $C_{26}$, $H_{38}$, $N_2$, $O_4$, $S_2$: C, 61.62; H, 7.56. Found: C, 61.98; H, 7.73.

*Example 1*

Into a suitable reaction vessel equipped with thermometer, stirrer and reflux condenser, there is introduced a mixture of 10 parts of 1-(4-methyl-3-sulfamoyl-phenyl)-1,3,3,6-tetramethyl-5-sulfamoyl indan, 3.9 parts of butyl formcel (a 40% solution of formaldehyde in butanol), 15 parts of butanol and 10 parts of xylol. The charge is heated gradually to the reflux temperature (about 93° C.) and maintained at that temperature for about 1 hour. Some of the volatile material (about 16 parts) is removed by distillation. The product produced is a clear, colorless resin having a viscosity of E on the Gardner-Holdt scale at 25° C. when measured on a 50% solids solution of the resin in a 50/50 mixture of xylol/butanol. A film of the resin thus produced is drawn down on glass and baked for 30 minutes at 300° F. The resultant cured film is hard and is not affected by xylol.

*Example 2*

30 parts of the aminoplast resin prepared according to Example 1 and 59 parts of a short oil alkyd resin (60% solids) are thoroughly mixed and a film is drawn down therefrom and baked for 30 minutes at 300° F. The film thus produced is transparent, hard and had excellent chemical resistance.

*Example 3*

Into a suitable reaction vessel equipped as in Example 1, there is introduced 262 parts of 1-[4-methyl-3-(propylsulfamoyl)-phenyl]-1, 3,3,6-tetramethyl-5-propylsulfamoyl indan, 78 parts of butyl formcel, 300 parts of butanol and 200 parts of xylol. The procedure of Example 1 is carried out in all details except that the refluxing period is 12 hours. Thereafter, 300 parts of volatiles are removed by vacuum distillation. The clear water-white resins thus produced are compatible with alkyd resins. These mixtures of the novel aminoplast resins of the present example with conventional alkyd resins when baked at normal baking schedules yield transparent, chemical-resistant films.

Amongst the sulfamoyl indanes which may be used to prepare the aldehyde-condensation products of the present invention are 1-(3-sulfamoylphenyl)-1,3,3-trimethyl-5-sulfamoyl indan; 1-(4-sulfamoylphenyl)-1,3,3-trimethyl-6-sulfamoyl-indan; 1-(3-sulfamoylphenyl)-1,3-diethyl-3-methyl-5-sulfamoyl-indan; 1-(3-sulfamoylphenyl)-1,3-dibutyl-3-methyl-5-sulfamoyl-indan; 1-(3-sulfamoylphenyl)-1,3-dichloro-3-methyl-5-sulfamoyl-indan; 1-(4-sulfamoylphenyl)-1,3-dipropyl-3-methyl-6-sulfamoyl-indan; 1-(3-methylsulfamoylphenyl) - 1,3,3 - trimethyl - 5 - methylsulfamoyl-indan; 1-(3-methylsulfamoylphenyl)-1,3-dibutyl-3-methyl-5-methylsulfamoyl-indan; 1-(3-methylsulfamoylphenyl)-1,3-dibromo-3-methyl-5-methylsulfamoyl-indan; 1-(4-propylsulfamoylphenyl)-1,3,3-trimethyl-6-propylsulfamoyl-indan; 1-(4-propylsulfamoylphenyl)-1,3-dipropyl-3-methyl-6-propylsulfamoyl-indan; 1-(4-propylsulfamoylphenyl)-1,3-diiodo-3-methyl-6-propylsulfamoyl-indan; 1-(3-laurylsulfamoylphenyl)-1,3,3-trimethyl-5-laurylsulfamoyl-indan; 1-(3-laurylsulfamoylphenyl)-1,3-dibutyl-3-methyl-5-laurylsulfamoyl-indan; 1-(3-laurylsulfamoylphenyl) - 1,3 - dichloro - 3 - methyl - 5 - laurylsulfamoyl-indan; 1-(3-stearylsulfamoylphenyl)-1,3,3-trimethyl-5-stearylsulfamoyl-indan; 1-(3-eicosylsulfamoylphenyl)-1,3,3-trimethyl-5-eicosylsulfamoyl-indan; 1-(3-eicosylsulfamoylphenyl) - 1,3 - diethyl - 3 - methyl - 5 - eicosylsulfamoyl-indan; 1-(3-eicosylsulfamoylphenyl)-1,3-diiodo-3-methyl-5-eicosylsulfamoyl-indan; 1-(4-methyl-3-sulfamoylphenyl) - 1,3,3,6 - tetramethyl - 5 - sulfamoyl - indan; 1-(4-methyl-3-sulfamoylphenyl)-1,3-dipropyl-3,6-dimethyl-5-sulfamoyl-indan; 1-(4-methyl-3-sulfamoylphenyl)-1,3-dibutyl-3,6-dimethyl-5-sulfamoyl-indan; 1-(4-methyl - 3 - sulfamoylphenyl) - 1,3 - dichloro - 3,6 - dimethyl-5-sulfamoyl-indan; 1-(4-butyl-3-sulfamoylphenyl)-6-butyl-1,3,3-trimethyl-5-sulfamoyl-indan; 1-[4-propyl-3-(methylsulfamoyl) - phenyl] - 1,3,3 - trimethyl - 6 - propyl-5-methylsulfamoyl-indan; 1-[4-propyl-3-(butylsulfamoyl)-phenyl]-1,3,3-tributyl-6-propyl-5-butylsulfamoyl-indan; 1-[4-propyl-3-(hexylsulfamoyl)-phenyl]-1,3,3-trimethyl-6-propyl-5-hexylsulfamoyl-indan; 1-[4-propyl-3-(decylsulfamoyl) - phenyl] - 1,3,3 - trimethyl - 6 - propyl - 5-decylsulfamoyl-indan; 1-[4-propyl-3-(hexadecylsulfamoyl) - phenyl] - 1,3,3 - trimethyl - 6 - propyl - 5 - hexadecylsulfamoyl-indan, and the like.

Amongst the aldehydes that may be used to form condensation products with the sulfamoyl indanes of the present invention are formaldehyde, acetaldehyde, heptaldehyde, benzaldehyde, crotonic aldehyde, acrolein, furfural and the like. The term "aldehydes" includes not only the aldehydes themselves but also compounds engendering aldehydes; for instance, p-formaldehyde, tetraethylene pentamine, trioxy methylene, p-aldehyde, and the like. Of these, formaldehyde is generally preferred.

Depending on the particular aldehyde selected and/or the ultimate results desired, the reaction between the aldehyde and the sulfamoyl indanes, the solvent medium, if any, can be aqueous or non-aqueous such as organic solvents, either reactive or inert.

If it is desired to produce condensation products of aldehydes and sulfamoyl indanes that are ether derivatives, one may react the aldehyde and sulfamoyl indan in the presence of a compound containing an alcoholic hydroxy group. As an alternative procedure, one may react the aldehyde with the sulfamoyl indan and thereafter react the condensation product with a compound containing an alcoholic hydroxy group. Amongst these alcoholic compounds which may be used are the mono and polyhydric alcohols such as methanol, ethanol, butanol, ethyl butanol, ethyl hexanol, lauryl alcohol, cetyl alcohol, stearyl alcohol, allyl alcohol, oleyl alcohol, glycol, glycerol, mannitol, sorbitol, benzyl alcohol, terpineol, borneol, abietineol, furfuryl alcohol and the like.

Among mono- and polyhydric alcohols containing further substituents there may be named keto- and aldehyde alcohols like aldol, glycol aldehyde, glycerol aldehyde; the groups of the carbohydrates, for example glucose, cane sugar, trihexosane or their polymerides, such as dextrine, starches, gum arabic, tragacanth or the like, oxycarboxylic acids, such as tartaric acid, malic acid, ricinoleic acid, saccharic acid or their esters or the like; halogen alkyl alcohols, for instance chlorethyl alcohol, glycol chlorhydrin, glycerol chlorhydrin, chloralhydrate; amino-alcohols, for instance mono-, di- and triethanolamine or the like.

Among the polyhydric alcohols those are of importance in which some of the oxy-groups have been etherified or esterified. Among these are glycolmonoethyl ether, glycolacetate, glycerol- mono- and diethyl ether, for instance diethyline, also cyclohexanone glycerol ($O\alpha,O\beta$-cyclohexylidene-glycerol), glycerolmono- or di-esters, for example those of saturated or unsaturated fatty acids. Also ester resins having free hydroxyl groups of the type of the alkyd resins may be used, for example the esters of glycerolphthalic acid ester, glycerol adipic acid ester or glycerol sebasic acid ester which still contain free hydroxyl groups.

Instead of the compounds containing alcoholic hydroxy groups themselves compounds may be used which are converted under the conditions of the reaction into others containing alcoholic hydroxyl groups, for example acetals, esters.

Particularly advantageous for the invention are those of the above-mentioned groups which are of the type of carbohydrates and because of their easy accessibility in nature.

The bodies which are to react may be brought together simultaneously or in any order of succession. In any case, the several components may be added in stages. Obviously mixtures of the individual components may be used.

In the preparation of the sulfamoyl indanes used in the present invention, it has been indicated that the sulfonyl chloride derivative of the indanes may be reacted with ammonia to produce unsubstituted sulfamoyl indanes or with monoalkyl amines to produce the alkyl substituted sulfamoyl indanes. Amongst the monoalkyl amines which may be used to produce the latter class of compounds are methyl amine, ethyl amine, propyl amine, butyl amine, amyl amine, hexyl amine, heptyl amine, octyl amine, nonyl amine, decyl amine, undecyl amine, dodecyl amine, tridecyl amine, tetradecyl amine, pentadecyl amine, hexadecyl amine, heptadecyl amine, octadecyl amine, nonadecyl amine, eicosyl amine and the like. Although these amines may be used either singly or in combination with one another, it is preferred that they be used singly. The condensation products of the present invention may be used in a plurality of applications either alone or in combination with other natural or synthetic resinous materials. Amongst the uses for the novel condensation products of the present invention are in adhesives, coating compositions, printing inks, molding compositions, laminating compositions, potting compositions, textile treating compositions including the treatment of natural and synthetic fibers and the fabrics derived therefrom including animal fibers as well as cellulosic fibers. Additionally, these novel condensation products may be used in the treatment of cellulosic pulp in paper making operations, in the treatment of non-fibrous regenerated cellulosic materials such as films, or they may be used in the treatment of leather for tanning purposes and the like.

If it is desired, the novel condensation products of the present invention may be used in combination with other aminoplast resins such as the aldehyde condensation products of such aldehyde-reactable compounds as urea, thiourea, ethylene diurea, and aminotriazines such as melamine, benzoguanamine, formoguanamine, acetoguanamine, ammeline, ammelide, the mono- di- or trialkyl melamines such as 2,4,6-triethyl-triamino-1,3,5-triazine and the like. These condensation products may be unmodified or alcohol modified aldehyde reaction products. Still further, one may make use of alkyd resins prepared by reacting a polycarboxylic acid free of nonbenzenoid unsaturation with a polyhydric alcohol such as the glyptal resins either oil free or oil modified, wherein the oil length may be either short oil, medium oil or long oil alkyd resins. Still further, the novel condensation products of the present invention may be utilized in combination with ketone-formaldehyde resins and the phenolics such as the phenol-formaldehyde resins or the epoxy type resins such as those derived by reacting a halohydrin such as epichlorohydrin with a phenol such as bis phenol and the like. Still further, the novel condensation products of the present invention may be utilized with such synthetic resins as the linear super polyamides, the linear super polyesters and the like. The novel condensation products of the present invention may additionally be used in combination with natural resinous materials such as the coumarone-indene, gum damar, ester gum and the like.

The condensation products of the present invention are prepared by reacting the sulfamoyl indanes with aldehydes in a mol ratio varying between about 1:1 and 1:4, respectively, and preferably 1:1.5 to 1:3.0, respectively for the unsubstituted sulfamoyl indanes. For the substituted sulfamoyl indanes where there are only two aldehyde reactive hydrogens on the nitrogen atoms, condensation products can be prepared by reacting said substituted sulfamoyl indanes with aldehydes in a mol ratio varying between about 1:1 and 1:2. If it is desired to insure that as much aldehyde as possible reacts with the sulfamoyl indan, whether substituted or unsubstituted, an excess of aldehyde may be used.

The compositions of the present invention may be utilized with pigments, dyes, lubricants, promoters, catalysts, accelerators, opacifiers, driers, and the like, when and as needed.

This application is a continuation-in-part of my earlier filed application, having the Serial No. 414,860, filed March 8, 1954, entitled "Novel Compositions of Matter and Processes of Preparing the Same." More specifically, the parent application relates to a process for the preparation of indan carboxylic acids and their use in the preparation of alkyd resins.

I claim:

1. A process for the manufacture of condensation products comprising condensing an aldehyde and a compound having the formula:

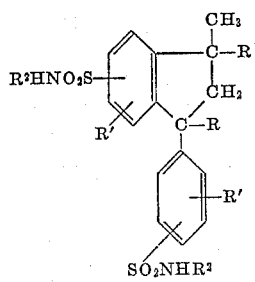

wherein R is a member selected from the group consisting of a halo group and an alkyl group, containing from 1 to 4 carbon atoms, R' is an alkyl group containing from 1 to 4 carbon atoms and $R^2$ is a member selected from the group consisting of H and an alkyl group containing 1 to 20 carbon atoms.

2. A process for the manufacture of condensation products comprising condensing formaldehyde and a compound having the formula:

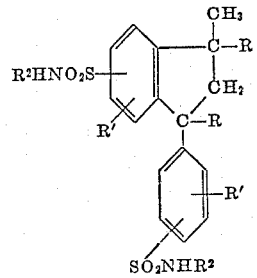

wherein R is a member selected from the group consisting of a halo group and an alkyl group containing from 1 to 4 carbon atoms, R' is an alkyl group containing from 1 to 4 carbon atoms and $R^2$ is a member selected from the group consisting of H and an alkyl group containing 1 to 20 carbon atoms.

3. A process for the manufacture of condensation products comprising reacting an aldehyde with 1-(4-methyl-sulfamoyl-phenyl)-1,1,3,6-tetramethyl-5-sulfamoyl indan.

4. The reaction product produced by reacting an aldehyde with a compound having the formula:

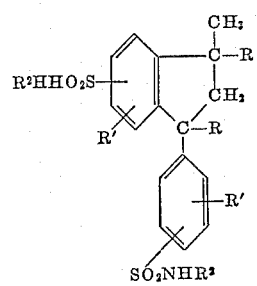

wherein R is a member selected from the group consisting of a halo group and an alkyl group containing from 1 to 4 carbon atoms, R' is an alkyl group containing from 1 to 4 carbon atoms and $R^2$ is a member selected from the group consisting of H and an alkyl group containing 1 to 20 carbon atoms.

5. The reaction product produced by reacting formaldehyde with a compound having the formula:

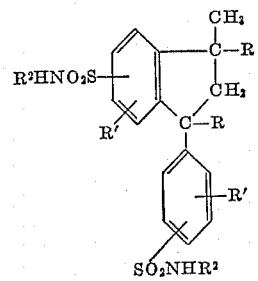

wherein R is a member selected from the group consisting of a halo group and an alkyl group containing from 1 to 4 carbon atoms, R' is an alkyl group containing from 1 to 4 carbon atoms and $R^2$ is a member selected from the group consisting of H and an alkyl group containing 1 to 20 carbon atoms.

6. The reaction product produced by reacting formaldehyde with 1-(4-methyl-sulfamoyl-phenyl)-1,1,3,6-tetramethyl-5-sulfamoyl indan.

7. A process for the manufacture of condensation products comprising condensing an aldehyde with a compound containing at least one alcoholic hydroxy group and a compound having the formula:

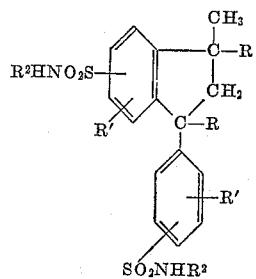

wherein R is a member selected from the group consisting of a halo group and an alkyl group containing from 1 to 4 carbon atoms, R' is an alkyl group containing from 1 to 4 carbon atoms and $R^2$ is a member selected from the group consisting of H and an alkyl group containing 1 to 20 carbon atoms.

8. A process for the manufacture of condensation products comprising condensing formaldehyde with a compound containing at least one alcoholic hydroxy group and a compound having the formula:

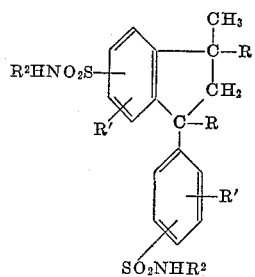

wherein R is a member selected from the group consisting of a halo group and an alkyl group containing from 1 to 4 carbon atoms, R' is an alkyl group containing from 1 to 4 carbon atoms and $R^2$ is a member selected from the group consisting of H and an alkyl group containing 1 to 20 carbon atoms.

9. A process for the manufacture of condensation products comprising condensing an aldehyde with an aliphatic alcohol and 1-(4-methyl-sulfamoyl-phenyl)-1,1,3,6-tetramethyl-5-sulfamoyl indan.

10. The reaction product produced by reacting an aldehyde with a compound containing at least one alcoholic hydroxy group and a compound having the formula:

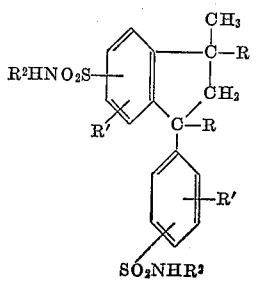

wherein R is a member selected from the group consisting of a halo group and an alkyl group containing from 1 to 4 carbon atoms, R' is an alkyl group containing from 1 to 4 carbon atoms and $R^2$ is a member selected from the group consisting of H and an alkyl group containing 1 to 20 carbon atoms.

11. The reaction product produced by reacting formaldehyde with a compound containing at least one alcoholic hydroxy group and a compound having the formula:

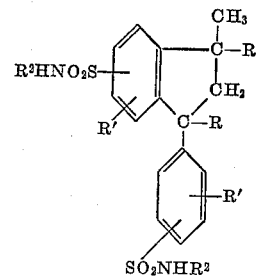

wherein R is a member selected from the group consisting of a halo group and an alkyl group containing from 1 to 4 carbon atoms, R' is an alkyl group containing from 1 to 4 carbon atoms and $R^2$ is a member selected from the group consisting of H and an alkyl group containing 1 to 20 carbon atoms.

12. The reaction product produced by reacting an aldehyde with a compound containing an alcoholic hydroxy group and 1-(4-methyl-3-sulfamoylphenyl)-1,1,3,6-tetramethyl-5-sulfamoyl indan.

13. The reaction product produced by reacting formaldehyde, methyl alcohol and 1-(4-methyl-3-sulfamoylphenyl)-1,1,3,6-tetramethyl-5-sulfamoyl indan.

14. The reaction product produced by reacting formaldehyde, butyl alcohol and 1-(4-methyl-3-sulfamoylphenyl)-1,1,3,6-tetramethyl-5-sulfamoyl indan.

15. A process for the manufacture of condensation products comprising condensing formaldehyde, methyl alcohol and 1-(4-methyl-3-sulfamoylphenyl)-1,1,3,6-tetramethyl-5-sulfamoyl indan.

16. A process for the manufacture of condensation products comprising condensing formaldehyde, butyl alcohol and 1-(4-methyl-3-sulfamoylphenyl)-1,1,3,6-tetramethyl-5-sulfamoyl indan.

17. The reaction product produced by reacting formaldehyde and 1-(4-sulfamoylphenyl)-1,3,3-trimethyl-6-sulfamoyl-indan.

18. The reaction product produced by reacting formaldehyde and 1-(4-methyl-3-sulfamoylphenyl)-1,3-diethyl-3,6-dimethyl-5-sulfamoyl-indan.

19. The reaction product produced by reacting formaldehyde and 1-(3-methyl-4-sulfamoylphenyl)-1,3,3,5-tetramethyl-6-sulfamoyl-indan.

20. The reaction product produced by reaction formaldehyde and 1-[4-methyl-3-(propylsulfamoyl)-phenyl]-1,3,3,6-tetramethyl-5-propylsulfamoyl-indan.

No references cited.